No. 690,301. Patented Dec. 31, 1901.
R. R. LEE.
ORE CONCENTRATOR.
(Application filed Apr. 11, 1901.)
(No Model.) 2 Sheets—Sheet 2.
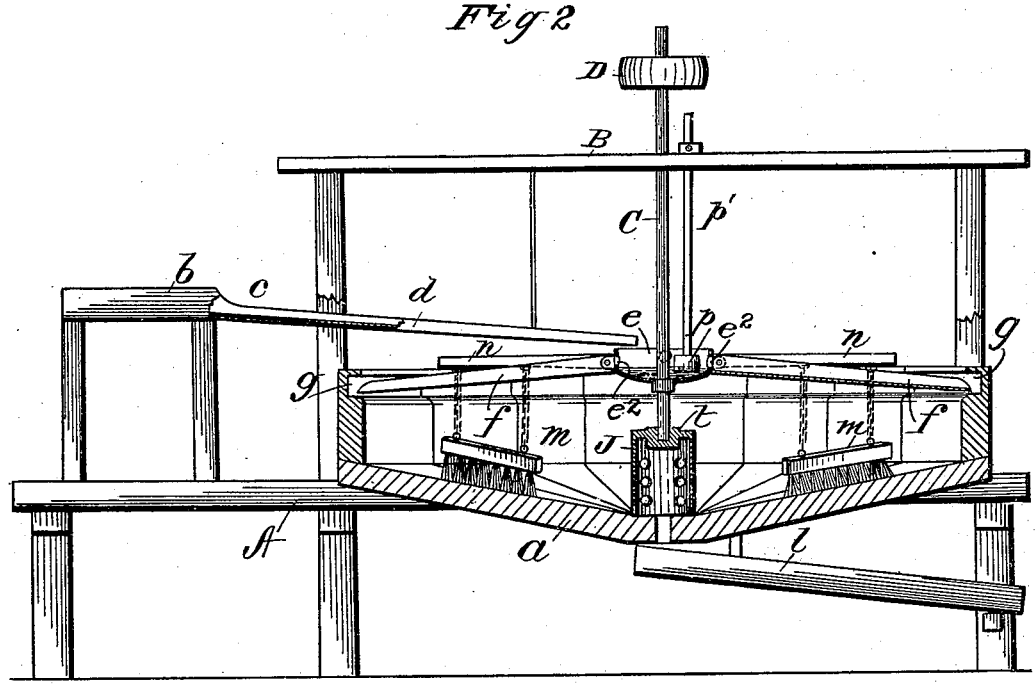
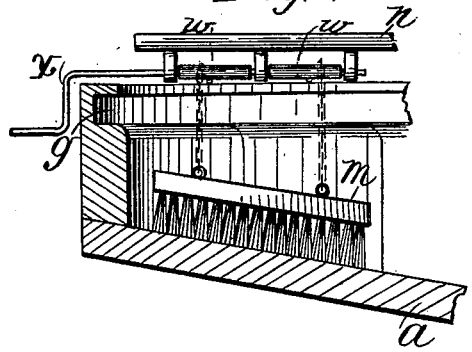
WITNESSES:
W. R. Edelen
Edw. W. Byrn.
INVENTOR
Richard R. Lee
BY Munn & Co.
ATTORNEYS
THE NORRIS PETERS CO., PHOTO-LITHO., WASHINGTON, D. C.

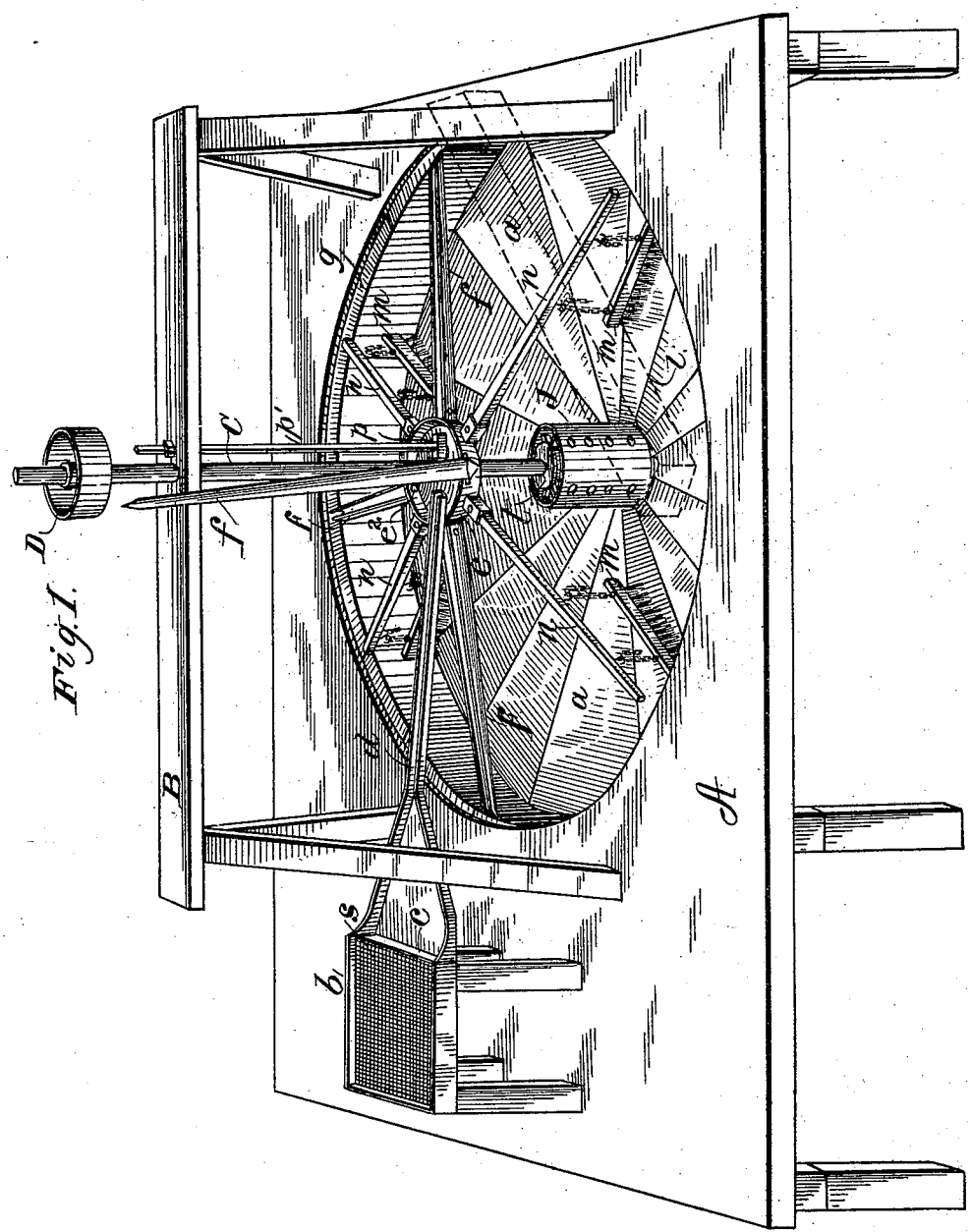

UNITED STATES PATENT OFFICE.

RICHARD ROWE LEE, OF PINOS ALTOS, TERRITORY OF NEW MEXICO.

ORE-CONCENTRATOR.

SPECIFICATION forming part of Letters Patent No. 690,301, dated December 31, 1901.

Application filed April 11, 1901. Serial No. 55,332. (No model.)

*To all whom it may concern:*

Be it known that I, RICHARD ROWE LEE, of Pinos Altos, in the county of Grant and Territory of New Mexico, have invented a new and useful Improvement in Ore-Concentrators, of which the following is a specification.

My invention relates to ore-concentrators of that form in which a circular pan is provided with a central revolving vertical shaft bearing radial arms which carry scrubbing-brushes that travel upon the bottom of the pan; and it consists in the special construction and arrangement of the parts which I will first describe with reference to the drawings and then point out in the claims.

Figure 1 is a perspective view looking down into the concentrator. Fig. 2 is a vertical central section, and Fig. 3 is a sectional detail showing means for raising or adjusting vertically the scrubbing-brushes.

In the drawings, A represents a suitable stand having an upright framework B mounted thereon. The stand A has within it the large basin or pan $a$. Centrally in this pan is arranged a vertical shaft C, having either a band-pulley D or gear-wheels by which it is rotated. This shaft has four radial arms $n$, which are flexibly connected to brushes $m$, which as the arms revolve drag around upon and rub the concentrates upon the bottom of the pan. The shaft C has rigidly attached to it, a little distance above the pan, a cup or bowl $e$, to which the radial arms $n$ are attached, and to this bowl are hinged at their inner ends a series of four radial troughs $f$, the bowl having at such points openings $e^2$, that communicate with the inner ends of the troughs. The outer ends of these troughs extend to the outer periphery of the pan $a$ and into a groove $g$, formed at the upper edge in the outer wall of said pan.

Upon the stand A is erected at one side a receiving-box $b$, having a detachable screen $s$ and a bottom $c$, of copper, and also a copper-lined trough $d$, that leads to and discharges into the central bowl $e$. Within the bowl there is a stationary skimmer or stirrer $p$, attached to the lower end of a vertical rod $p'$, fixed to the framework B.

In the conical portion of the pan $a$, in central position, is an overflow-dam J, constructed in circular form and fixed tightly to the bottom of the pan. This dam rises some distance above the level of the bottom of the pan and is perforated with holes through which the tailings and water flow off to the interior of said dam, which interior opens into a subjacent discharge-trough $l$.

The lower end of the shaft C turns loosely in a spider-frame $t$, fixed in the top of the dam J, which forms the bearing for the lower end of said shaft.

In order to permit the brushes $m$ to be adjusted vertically or lifted when cleaning out, (see Fig. 3,) the chains of said brushes are attached to and wound upon small windlasses $w$ $w$, fixed to a crank-shaft $x$, which crank-shaft is journaled in hangers from the radial arms $n$. To permit the troughs $f$ to be gotten out of the way in cleaning out the pan, they are turned upwardly upon their inner hinged ends, the nearest trough $f$ in Fig. 1 being so shown as turned up. The inner ends of the troughs $f$ and arms $n$, it will be seen, are attached to the bowl $e$ and lie practically in the same horizontal plane.

In the operation of my concentrator the pulverized ore, with a suitable amount of water, is fed upon the screen $s$ and passes onto the amalgamated copper plates in the bottom of the box $b$ and the trough $d$, the mercury on which catches a portion of the gold and silver. Thence the ore passes to the bowl $e$ onto a surface of mercury, which catches other portions of precious metals, the mercury being kept clean and alive by the constant skimming and stirring action which the stationary piece $p$ affords as the bowl rotates beneath it. Thence the ore and water pass down the troughs $f$ to the peripheral groove $g$ in the pan, whence it slowly trickles in thin sheets evenly over the bottom of the pan and under the action of the scrubbing-brushes $m$. The heavy metals gravitate to the bottom of the pan near the center, while the lighter tailings, with the water, flow off through the holes in the dam J to the tailings-trough below. Any number of these holes in the dam J may be plugged up from the bottom to cause the water-level of the overflow to be higher or lower, as may be desired.

The bottom and sides of the pan $a$ are to be made of wood.

In pointing out more clearly the distinctive features of my invention I would state that I am aware that the liquid mixture of ore and water has been carried from a central bowl to the outer periphery of the pan by troughs that are hinged at or near the middle of their length. Such location of hinge-joint is liable to become obstructed by the ore, so as to clog and become inoperative, and I therefore make the trough rigid from end to end and hinge its inner end directly to the bowl, so that while it may be lifted out of the way it never becomes clogged at the joint. I also attach the radial troughs $f$ and radial arms $n$, carrying the brushes, to the central bowl all in substantially the same horizontal plane, thus securing greater simplicity, more open space or clearance in the pan below, and a much smaller and more compact construction.

Having thus described my invention, what I claim as new, and desire to secure by Letters Patent, is—

1. In an ore-concentrator, the combination of a circular pan, a central vertical rotating shaft carrying a rigidly-attached bowl, two sets of radial arms connected to said bowl in the same horizontal plane, one set being provided with pendent and dragging rubbing devices, and the alternate set being constructed as troughs rigid from end to end, but hinged at their inner ends to the bowl opposite openings in the same and extending to the outer periphery of the pan substantially as described.

2. In an ore-concentrator, the combination with the pan, the vertical central rotating shaft having a rigidly-attached bowl with troughs radiating therefrom as described, a trough for discharging the ore into the said bowl, and a vertical rod secured stationary in the framework parallel to the central shaft and having at its lower end and dipping into the bowl a skimming and stirring blade acting upon the surface of the mercury to keep it clean to receive the contact of the stream of ore falling from the trough substantially as described.

3. In an ore-concentrator, the combination of a pan having a peripheral groove $g$ at the top and a conical bottom with a central perforated dam rising therefrom and a step-bearing on top of the same, a vertical shaft mounted thereon and having a rigidly-attached bowl attached thereto, two sets of radial arms attached to the bowl in the same horizontal plane, one set being provided with dragging and rubbing devices, and the alternate set being constructed as troughs rigid from end to end but hinged to the central bowl, a vertical rod fixed in the framework parallel to the shaft and bearing on its lower end a stirring and skimming blade entering the bowl, and a feed-trough discharging into said bowl substantially as shown and described.

RICHARD ROWE LEE.

Witnesses:
JOHN W. CASSIDY,
JOHN MCENNIS.